(12) United States Patent
Choi (10) Patent No.: US 9,365,195 B2
(45) Date of Patent: Jun. 14, 2016

(54) MONITORING METHOD OF VEHICLE AND AUTOMATIC BRAKING APPARATUS

(71) Applicant: HYUNDAI MOTOR COMPANY, Seoul (KR)

(72) Inventor: Jin Ha Choi, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/524,892

(22) Filed: Oct. 27, 2014

(65) Prior Publication Data
US 2015/0169959 A1    Jun. 18, 2015

(30) Foreign Application Priority Data

Dec. 17, 2013  (KR) ........................ 10-2013-0157419

(51) Int. Cl.
| | | |
|---|---|---|
| B60T 7/22 | (2006.01) | |
| G06T 7/20 | (2006.01) | |
| G06K 9/00 | (2006.01) | |

(52) U.S. Cl.
CPC ............... *B60T 7/22* (2013.01); *G06K 9/00805* (2013.01); *G06T 7/20* (2013.01); *B60T 2201/022* (2013.01)

(58) Field of Classification Search
CPC ........ G06K 9/00711; G06T 7/20; B60T 7/22; B60T 2201/022
USPC .......................................................... 701/70
See application file for complete search history.

(56) References Cited

U.S. PATENT DOCUMENTS

| | | | | |
|---|---|---|---|---|
| 9,043,071 | B1* | 5/2015 | Lombrozo | B62D 9/007 701/23 |
| 9,164,511 | B1* | 10/2015 | Ferguson | G05D 1/0231 |
| 2001/0048763 | A1 | 12/2001 | Takatsuka et al. | |
| 2005/0201590 | A1 | 9/2005 | Kudo | |
| 2008/0164985 | A1 | 7/2008 | Iketani et al. | |
| 2008/0215184 | A1 | 9/2008 | Choi et al. | |
| 2009/0303026 | A1 | 12/2009 | Broggi et al. | |
| 2011/0282581 | A1* | 11/2011 | Zeng | G01S 17/936 701/301 |
| 2013/0238233 | A1* | 9/2013 | Kim | B60K 6/00 701/301 |
| 2013/0270018 | A1* | 10/2013 | Kim | B60K 11/00 180/54.1 |
| 2014/0303827 | A1* | 10/2014 | Dolgov | B60W 30/00 701/23 |

FOREIGN PATENT DOCUMENTS

| | | |
|---|---|---|
| JP | 09-223227 A | 8/1997 |
| JP | 2001-344597 A | 12/2001 |
| JP | 2002-347517 A | 12/2002 |
| JP | 2005-228127 A | 8/2005 |
| JP | 2008-172441 A | 7/2008 |
| JP | 2009-116527 A | 5/2009 |
| KR | 10-2008-0022748 A | 3/2008 |
| KR | 10-0834577 B1 | 6/2008 |
| KR | 10-2009-0126586 A | 12/2009 |
| KR | 10-1032660 B1 | 5/2011 |
| KR | 10-2012-0104711 A | 9/2012 |
| KR | 10-1242087 B1 | 3/2013 |
| KR | 10-1281272 B1 | 7/2013 |

* cited by examiner

*Primary Examiner* — McDieunel Marc
*Assistant Examiner* — James E Stroud
(74) *Attorney, Agent, or Firm* — McDermott Will & Emery LLP (57) ABSTRACT

A monitoring method includes detecting an obstacle using an image including depth information. A preset region around the detected obstacle is set as an interest region. An interest object present in the interest region is detected. The detected interest object is tracked.

10 Claims, 8 Drawing Sheets

MONITORING METHOD OF VEHICLE AND AUTOMATIC BRAKING APPARATUS

CROSS-REFERENCE TO RELATED APPLICATION

This application is based on and claims the benefit of priority to Korean Patent Application No. 10-2013-0157419, filed on Dec. 17, 2013 in the Korean Intellectual Property Office, the entire content of which is incorporated herein by reference.

TECHNICAL FIELD

The present disclosure relates to a monitoring method and an automatic braking apparatus capable of sensing dangerous situations and automatically braking a vehicle by imaging an environment around the vehicle to detect and track obstacles around the vehicle.

BACKGROUND

In accordance with a development of electronic technologies, various systems for convenience and stability of a driver have been recently developed and used for a vehicle. Particularly, there is an autonomous emergency braking (AEB) for handling dangerous situations which are not recognized by the driver.

The AEB continuously monitors the situations around the vehicle and automatically brakes the vehicle when the dangerous situation occurs, thereby making it possible to prevent an unexpected accident.

In order to monitor the environment around the vehicle, a method detecting and continuously tracking obstacles around the vehicle by using images of the environment around the vehicle has been used. In order to detect the obstacles around the vehicle, a mono-image or a stereo-image may be used. Since a detection method using the mono-image has low separability between the obstacle and a background, detection performance is degraded. Therefore, a detection method using the stereo-image has been mainly used.

However, as in the case such as a pedestrian or a two-wheeled vehicle appeared behind the vehicle, even though the obstacles are detected using the stereo-image, small objects present in the vicinity of an object having a large size are recognized as a single object, so that a detection failure may often occur.

SUMMARY

The present disclosure has been made to solve the above-mentioned problems occurring in the prior art while advantages achieved by the prior art are maintained intact.

An aspect of the present disclosure provides a monitoring method capable of improving performance of detecting small objects present in the vicinity of an object having a large size when monitoring an environment around a vehicle, and an automatic braking apparatus capable of improving driving stability by early sensing a dangerous situation, accordingly.

An aspect of the present disclosure relates to a monitoring method including detecting an obstacle using an image including depth information. A preset region around the detected obstacle is set as interest region. An interest object present in the interest region is detected. The detected interest object is tracked.

The interest region may be left, right, and upper regions of the obstacle.

In the setting of the preset region as the interest region, a region around an obstacle having a preset size among the detected obstacles may be set as the interest region.

In the detecting of the interest object, the interest object may be detected using a portion classifier.

In the detecting of the interest object, feature points may be detected from the image, and the interest object may be detected in the interest region using the detected feature points.

In the detecting of the feature points, a threshold for detecting the feature points in the interest region may be set to be lower than a threshold in regions other than the interest region.

In the detecting of the feature points, the feature points present in the interest region may be detected.

In the tracking of the interest object, the number of detections of the interest object may be counted when the interest object is detected, a first interest object may be detected from a next frame image, it may be determined whether or not the first interest object detected from the next frame image and the interest object are the same object by comparing the first interest object detected from the next frame image and the interest object with each other, and the number of detections of the interest object may be updated when it is determined that the first interest object detected from the next frame image and the interest object are the same as each other.

In the determining whether or not the first interest object detected from the next frame image and the interest object are the same object, a first moving amount may be calculated by comparing the interest object with a second interest object detected from a previous frame image, a second moving amount may be calculated by comparing the interest object with the first interest object detected from the next frame image, and it may be determined that the first interest object detected from the next frame image is the same object as the interest object when a ratio of the first moving amount and the second moving amount is less than or equal to a preset ratio.

In the monitoring method, when a new obstacle is detected from an image formed by a stereo camera during the tracking of the interest object, it may be determined whether or not the new obstacle and a previously detected interest object are the same object by comparing the new obstacle and the previously detected interest object with each other, and when it is determined that the new obstacle and the interest object are the same object, the new obstacle may be tracked by increasing the number of detections of the interest object.

Another aspect of the present disclosure encompasses an automatic braking apparatus including a monitor and a brake. The monitor is configured to monitor an obstacle around a vehicle using the monitoring method as described above. The brake is configured to brake the vehicle when the monitored obstacle is present in a first preset distance from the vehicle.

The automatic braking apparatus may further include a warner configured to warn a driver when the monitored obstacle is present in a second preset distance from the vehicle.

BRIEF DESCRIPTION OF THE DRAWINGS

The above and other objects, features and advantages of the present disclosure will be more apparent from the following detailed description taken in conjunction with the accompanying drawings, in which like reference characters may refer to the same or similar parts throughout the different views. The drawings are not necessarily to scale, emphasis instead being placed upon illustrating the principles of the embodiments of the inventive concept.

DETAILED DESCRIPTION

Hereinafter, exemplary embodiments of the present inventive concept will be described in detail with reference to the accompanying drawings.

Figure 1:
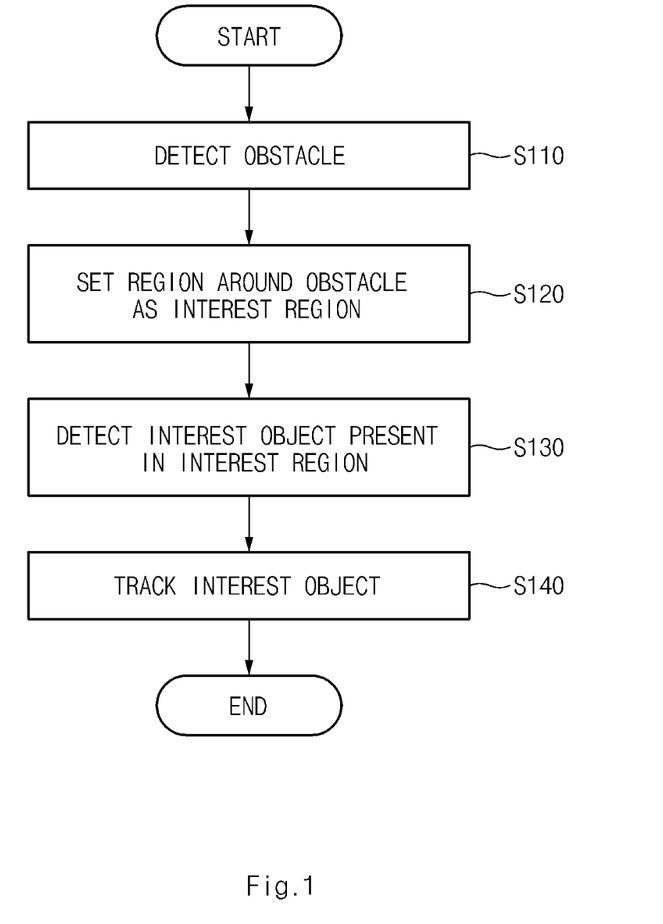
FIG. 1 is a flow chart for describing a monitoring method according to an exemplary embodiment of the present inventive concept.

FIG. 1 is a flow chart for describing a monitoring method according to an exemplary embodiment of the present inventive concept.

The monitoring method according to an exemplary embodiment of the present inventive concept may be implemented by program code executable by a microprocessor and may be operated by a processor such as a micro control unit (MCU), an electronic control unit (ECU), or the like mounted in a vehicle.

Referring to FIG. 1, first, an obstacle may be detected from images formed by a stereo camera (S110). Specifically, a disparity map may be generated using the images formed by the stereo camera and the obstacle may be detected using depth information of the disparity map.

The stereo camera may simultaneously form a plurality of images through a plurality of imaging lenses. The plurality of stereo images formed by the stereo camera may have disparity due to view point difference between the imaging lenses. A distance to an object may be detected by the disparity between the plurality of images formed by the stereo camera. As a method of generating the disparity map, there are several methods. However, the disparity map may generally indicate distance information due to the disparity between two images depending on brightness. Specifically, a near object may be indicated by a bright value and a far object may be indicated by a dark value.

Figure 2:
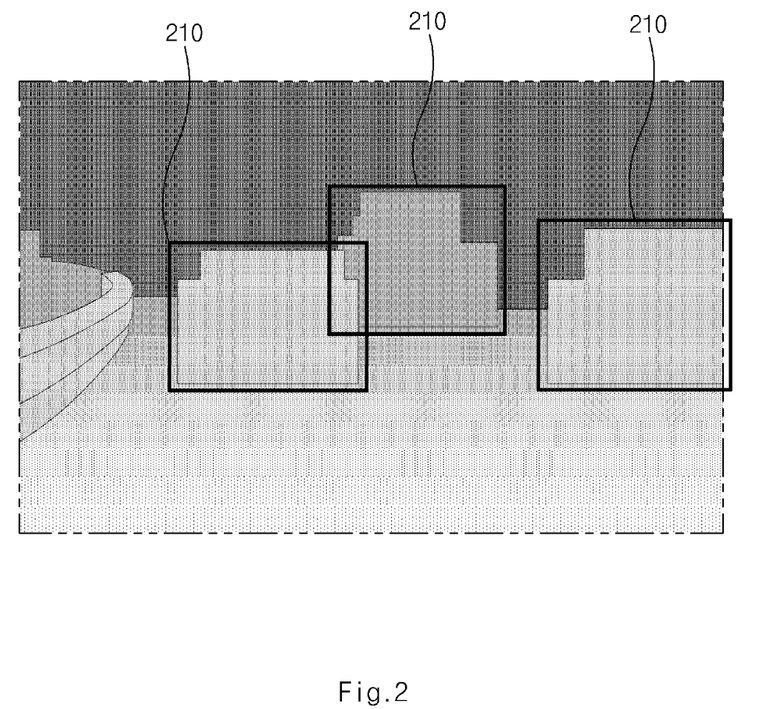
FIG. 2 is a diagram for describing a process of detecting obstacles using a disparity map according to an exemplary embodiment of the present inventive concept.

FIG. 2 is a diagram for describing a process of detecting obstacles using a disparity map according to an exemplary embodiment of the present inventive concept.

Referring to FIG. 2, the disparity map indicated by different brightness according to a distance is shown. As shown in FIG. 2, obstacles included in the disparity map may be indicated by a brighter value than surrounding pixels. As a result, the obstacle may be detected using a brightness difference from surrounding regions.

Figure 3A:
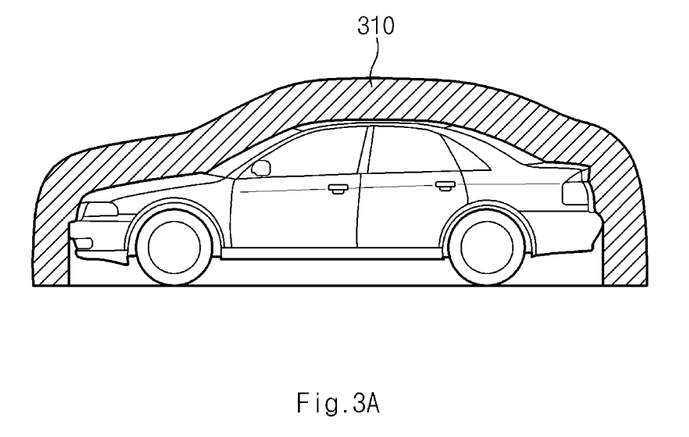
FIGS. 3A and 3B are diagrams showing interest regions according to an exemplary embodiment of the present inventive concept.
Figure 3B:
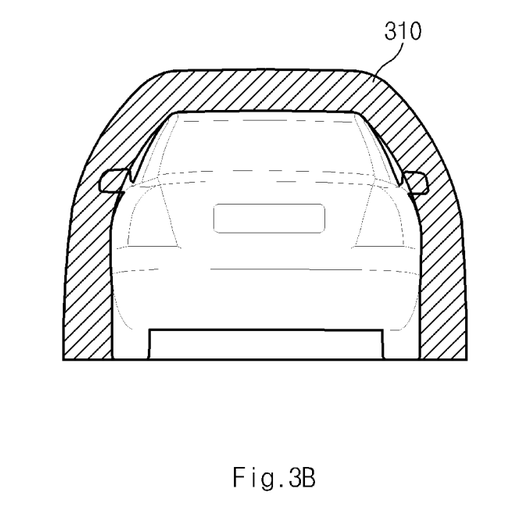

If the obstacle is detected, a preset region around the obstacle may be set as an interest region (S120). The interest region may correspond to a region which is intensively monitored to detect a small object present in the vicinity of the detected obstacle. The interest region may be left, right, and upper regions of the detected obstacle. This will be described with reference to FIG. 3.

FIGS. 3A and 3B are diagrams showing interest regions according to an exemplary embodiment of the present inventive concept.

FIGS. 3A and 3B each show cases in which a side and a rear of the vehicle are detected as the obstacle. Referring to FIGS. 3A and 3B, the left, right, and upper regions of the detected obstacle may be set as an interest region 310. A width of the interest region may be varied depending on a size or distance of the obstacle.

Meanwhile, when the interest region is set, a region around an obstacle having a preset size (e.g., a height of the obstacle of more than or equal to 1 m and less than or equal to 2 m) among the detected obstacles may be set as the interest region. The preset size of the obstacle may be set such that a pedestrian or a two-wheeled vehicle partly obscured by the obstacle can be detected from the interest region. The interest region may not need to be set when a size (particularly, height) of the obstacle is large (e.g., higher than 2 m), because the pedestrian or the two-wheeled vehicle would be fully obscured by the (large) obstacle. The interest region also may not need to be set when the size of the obstacle is small (e.g., lower than 1 m), because the pedestrian or the two-wheeled vehicle could not be obscured by the (small) obstacle. As a result, unnecessary operations may be excluded.

If the interest region is set, interest objects present in the interest region may be detected (S130). The interest objects may be detected by two methods.

Firstly, the interest objects may be detected using a portion classifier. The interest objects may be portions of the pedestrian or the two-wheeled vehicle such as a head, a hand, or an arm of the pedestrian, a wheel of the two-wheeled vehicle, and the like. Therefore, the interest objects such as the head, the hand, and the like may be detected by learning data of feature points such as the head, the hand, or the arm of the pedestrian, the wheel of the two-wheeled vehicle, and the like in advance and using the classifier.

Secondary, the interest objects may be detected using the feature points. Specifically, the feature points may be detected from the image formed by the stereo camera and a representative region of the detected feature point may be detected as the interest object.

When the feature points are detected, a threshold for detecting the feature points in the interest region may be set to be lower than a threshold in regions other than the interest region. If the threshold is set to be low, more feature points may be detected from the interest region.

In addition, when the feature points are detected, the feature points present in the interest region may be detected. That is, the feature points present in the regions other than the interest region may not be detected, but only the feature points present in the interest region may be detected. As a result, a data processing amount may be reduced.

If the feature points are detected, a representative region representing the detected feature points may be detected as the interest object. If the feature points are detected from the entire image, the representative region may be detected by assigning weights to the interest region. In general, the representative region may be set as a portion in which more feature points are detected, but the interest region may be intensively monitored by assigning the weights to the interest region.

Figure 4:
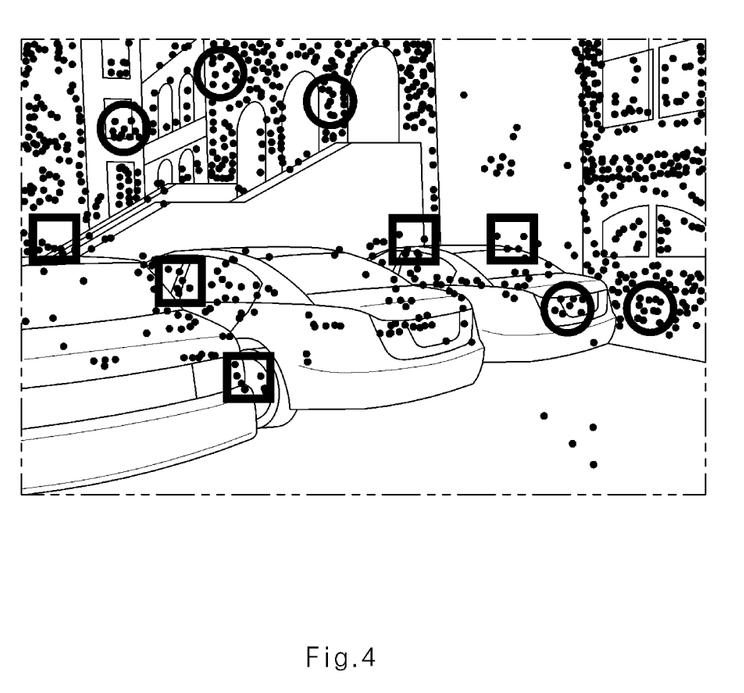
FIG. 4 is a diagram for describing a process of detecting an interest object using feature points according to an exemplary embodiment of the present inventive concept.

FIG. 4 is a diagram for describing a process of detecting an interest object using feature points according to an exemplary embodiment of the present inventive concept.

Referring to FIG. 4, the detected feature points are indicated on the image. Here, when the representative region is detected using a general method, regions indicated by a circular shape may be detected as the interest object. However, when the interest object is detected by assigning the weights to the interest region, region indicated by a quadrangular shape may also be detected as the interest object.

The monitoring method according to an exemplary embodiment of the present inventive concept may detect the interest object using at least one of the above described two methods, i.e., the portion classifier method and the feature point method.

If the interest object is detected, the interest object may be tracked (S140). A process of tracking the interest object will be described with reference to FIG. 5.

Figure 5:
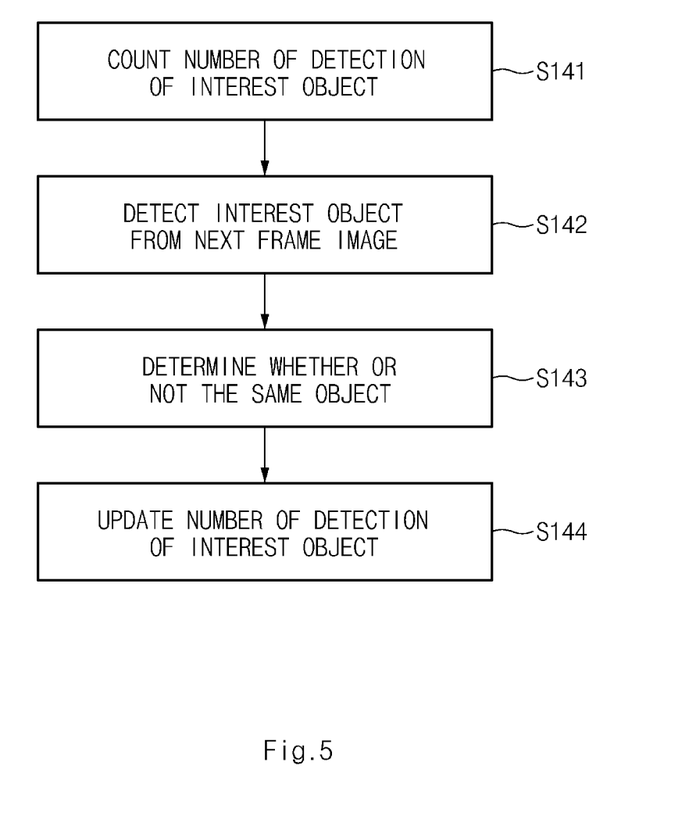
FIG. 5 is a flow chart for describing a process of tracking an interest object according to an exemplary embodiment of the present inventive concept.

FIG. 5 is a flow chart for describing a process of tracking an interest object according to an exemplary embodiment of the present inventive concept.

Referring to FIG. 5, first, the number of detections of the interest object may be counted (S141). In the case of an initially detected interest object, the number of detection may be counted as 1.

In addition, the interest object may be detected from a next frame image (S142). The interest object may also be detected in the next frame image by a process similar to that described above.

It may be determined whether or not two interest objects detected from continuous images are the same object (S143). Specifically, when the interest objects are classified by the classifier, it may be considered whether or not the interest objects are classified as the same object by the classifier. When the interest objects are detected by the feature points, it may be determined whether or not the interest objects are the same object through a feature point matching.

In addition, in determining whether or not the two interest objects are the same object, moving amounts of interest objects may be considered. Specifically, a first moving amount may be calculated by comparing the interest object with the interest object detected from a previous frame image. In addition, a second moving amount may be calculated by comparing the interest object with the interest object detected from a next frame image. In addition, when a ratio of the first moving amount and the second moving amount is a preset ratio or less, it may be determined that the interest object detected from the next frame image is the same object. The preset ratio may be set to a range such as 1:0.5 to 1:1.5, for example.

Figure 6A:
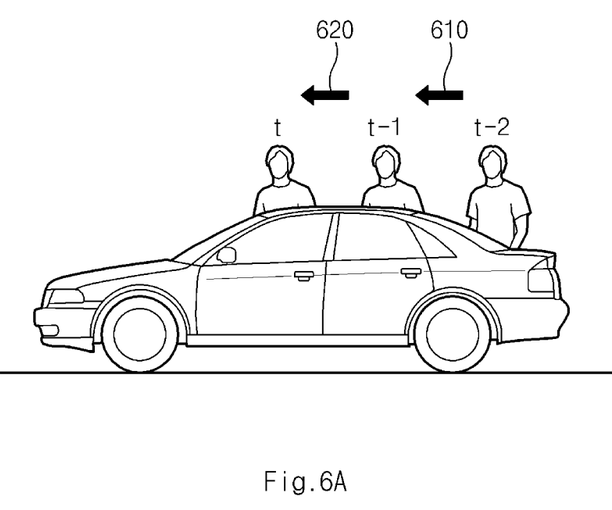
FIGS. 6A and 6B are diagrams for describing a tracking method of an interest object according to an exemplary embodiment of the present inventive concept.
Figure 6B:
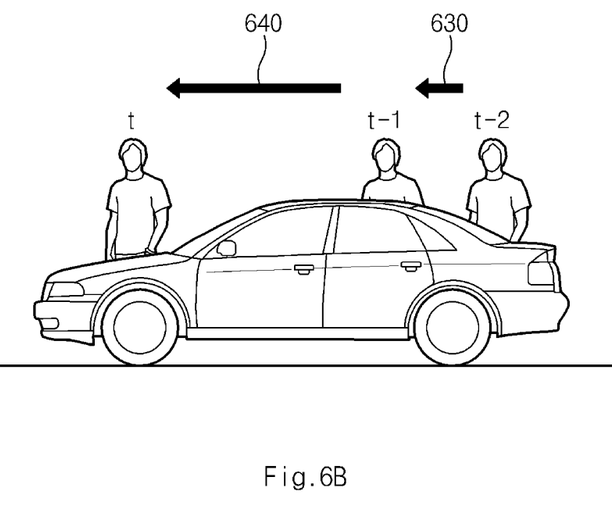

In the case in which the interest objects are classified by the classifier when the moving amounts of the interest objects are calculated, a position difference of the two interest objects which are classified as the same object by the classifier may be calculated as the moving amount. In addition, in the case in which the interest objects are detected by the feature points, motion vectors of the respective feature points may be calculated using an optical flow method and magnitude of the motion vectors may be calculated as the moving amount. A process of determining whether or not the two interest objects are the same object taking account of the moving amounts of the interest objects will be described with reference to FIG. 6.

FIGS. 6A and 6B are diagrams for describing a tracking method of an interest object according to an exemplary embodiment of the present inventive concept.

FIG. 6A is a diagram showing an example of a case in which the two interest objects are determined as the same object and FIG. 6B is a diagram showing an example of a case in which the two interest objects are determined as different objects.

Referring to FIG. 6A, the interest objects detected at timings t, t−1, and t−2 are indicated toward the rear of a vehicle detected as the obstacle. A first moving amount 610 may be calculated by comparing the interest objects detected at the timings t−2 and t−1. In addition, a second moving amount 620 may be calculated by comparing the interest objects detected at the timings t−1 and t−2. Here, in order to determine whether or not the interest object detected at the timing t is the same as the interest object detected at the timing t−1, the first moving amount 610 and the second moving amount 620 may be compared with each other. When the first moving amount and the second moving amount are similar to each other and a ratio of two moving amounts is a preset ratio or less, as shown in FIG. 6A, the interest object detected at the timing t may be determined as the same object as the interest object detected at the timing t−1.

Referring to FIG. 6B, the interest objects detected at timings t, t−1, and t−2 are indicated toward the rear of a vehicle detected as the obstacle. A first moving amount 630 may be calculated by comparing the interest objects detected at the timings t−2 and t−1. In addition, a second moving amount 640 may be calculated by comparing the interest objects detected at the timings t−1 and t−2. Here, in order to determine whether or not the interest object detected at the timing t is the same as the interest object detected at the timing t−1, the first moving amount 630 and the second moving amount 640 may be compared with each other. When the first moving amount and the second moving amount have a significant difference and a ratio of two moving amounts exceeds a preset ratio, as shown in FIG. 6B, the interest object detected at the timing t may be determined as an object different from the interest object detected at the timing t−1.

Meanwhile, in determining whether or not the two interest objects are the same as each other, the second moving amounts 620 and 640 of FIGS. 6A and 6B and an average value of the previously calculated moving amounts may be compared with each other.

If it is determined that the two interest objects are the same object, the number of detections of the interest object may be updated (S144). That is, the monitoring method according to an exemplary embodiment of the present inventive concept may detect the interest objects from temporally continuous images, respectively, and count the number of detections of the interest object depending on whether or not the detected interest objects are the same object.

The number of detections of the interest object may be counted in order to determine whether or not the interest object is mis-detected. That is, the interest object which is not detected a preset number of times or more may be determined as the mis-detected object and may be excluded, so that detection performance may be improved.

Meanwhile, when a new obstacle is detected while tracking the interest object, the new obstacle and the previously detected interest object may be compared with each other to thereby determine whether or not they are the same object. In addition, when it is determined that the new obstacle and the previously detected interest object are the same object, the new obstacle may be tracked by increasing the number of detections of the interest object. This will be described in detail with reference to FIG. 7.

Figure 7:
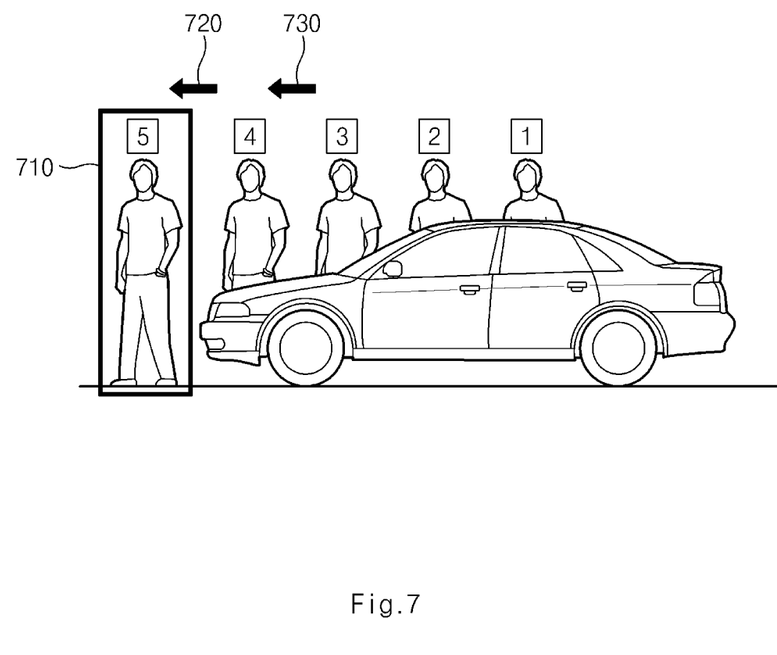
FIG. 7 is a diagram for describing a tracking method of an interest object according to another exemplary embodiment of the present inventive concept.

FIG. 7 is a diagram for describing a tracking method of an interest object according to another exemplary embodiment of the present inventive concept.

Referring to FIG. 7, the pedestrians may be detected at the rear of the vehicle detected as the obstacle. While counting the number of detections by tracking the detected pedestrians, a new obstacle 710 may be detected by the disparity map. If the new obstacle is detected by the disparity map, it may be determined whether or not the new obstacle and the tracking interest object are the same object by comparing the new obstacle and the tracking interest object with each other.

Specifically, when a moving amount 730 is calculated by comparing the new obstacle and the interest object detected from the previous frame with each other and a ratio of two moving amounts is a preset ratio or less by comparing the moving amount 730 and a moving amount 720 calculated from the previous frame with each other, it may be determined that the new obstacle is the same object as the tracking interest object.

When it is determined that the new obstacle and the tracking interest object are the same object, the obstacle may be tracked by increasing the number of detections of the interest object. That is, if it is determined that the new obstacle is the same as the interest object after the interest object is detect four times, as shown in FIG. 7, the number of detections of the new obstacle 710 may be counted to five and the new obstacle may be then tracked.

Figure 8:
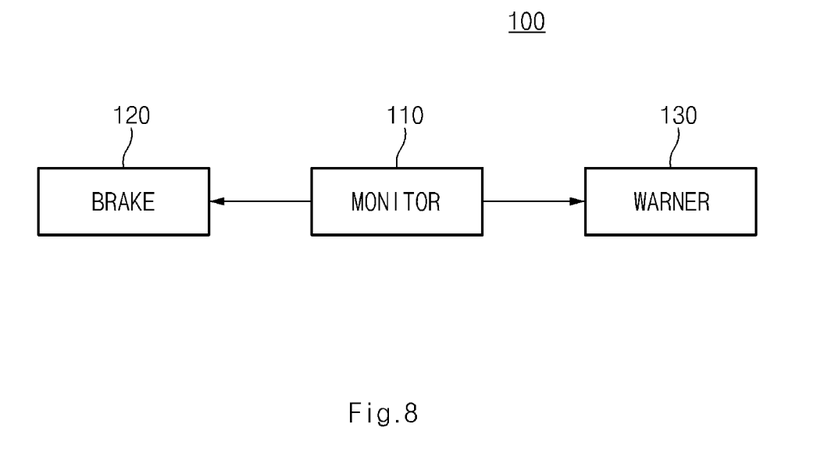
FIG. 8 is a block diagram showing a configuration of an automatic braking apparatus according to an exemplary embodiment of the present inventive concept.

FIG. 8 is a block diagram showing a configuration of an automatic braking apparatus according to an exemplary embodiment of the present inventive concept.

Referring to FIG. 8, the automatic braking apparatus 100 may include a monitor 110, a brake 120, and a warner 130.

The monitor 110 may monitor the obstacle detected from the image including depth information. Specifically, the monitor 110 may detect the obstacle using the image including the depth information and detect the interest objects present in the preset interest region around the obstacle. In addition, the monitor 110 may monitor the obstacles around the vehicle by tracking the interest objects.

Since the monitoring method of the obstacles around the vehicle has been described with reference to FIGS. 1 to 7, a detailed description thereof will be omitted.

The brake 120 may brake the vehicle when the obstacle monitored by the monitor 110 is present in a first distance from the vehicle. Because the image for detecting the obstacle includes the depth information, the distance from the vehicle to the obstacle may be detected. Meanwhile, the first preset distance may be set to be proportional to a driving speed of the vehicle.

The warner 130 may warn a driver when the obstacle monitored by the monitor 110 is present in a second preset distance from the vehicle. To this end, the warner 130 may be implemented by a voice outputting device such as a speaker or an image outputting device such as a monitor. The preset second distance may be set to be longer than the preset first distance and may be proportional to the driving speed of the vehicle.

The monitoring method according to an exemplary embodiment of the present inventive concept may track the obstacles before the obstacles are detected by the disparity map. As a result, even when the pedestrian obscured by the obstacle such as the vehicle, or the like suddenly appears, the time for deciding the misrecognition may be reduced and the obstacle may be more stably detected. In addition, the obstacle detection time may be reduced, thereby making it possible to early inform the driver of the dangerous situation.

In addition, when the monitoring method according to various exemplary embodiments of the present inventive concept is applied to the autonomous emergency braking (AEB), it is possible to secure the longer braking distance and stably operate the system.

As described above, according to exemplary embodiments of the present inventive concept, the monitoring method may track the obstacles before the obstacles are detected by the disparity map. As a result, even when the pedestrian obscured by the obstacle such as the vehicle, or the like suddenly appears, the time for deciding the misrecognition may be reduced and the obstacle may be more stably detected.

In addition, when the monitoring method according to various exemplary embodiments of the present inventive concept is applied to the autonomous emergency braking (AEB), it is possible to secure the longer braking distance and early inform the driver of the dangerous situation.

Although the preferred embodiments of the present inventive concept have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. A monitoring method, implemented by a monitor configured to brake a vehicle, the monitor comprising a microprocessor mounted in the vehicle and a stereo camera, comprising: detecting, in the monitor, an obstacle using an image formed by the stereo camera and including depth information; setting, in the monitor, a preset region around the detected obstacle as an interest region; detecting, in the monitor, an interest object present in the interest region, wherein the detecting of the interest object includes: detecting feature points from the image; and detecting the interest object in the interest region using the feature points; and tracking, in the monitor, the detected interest object, wherein in the detecting of the feature points, a threshold for detecting the feature points in the interest region is set to be lower than that in regions other than the interest region.

2. The monitoring method according to claim 1, wherein the interest region is left, right, and upper regions of the obstacle.

3. The monitoring method according to claim 1, wherein the setting of the preset region as the interest region includes setting, as the interest region, a region around an obstacle having a preset size among the detected obstacles.

4. The monitoring method according to claim 1, wherein the detecting of the interest object includes detecting the interest object using a portion classifier.

5. The monitoring method according to claim 1, wherein the detecting of the feature points includes detecting the feature points present in the interest region.

6. The monitoring method according to claim 1, wherein the tracking of the interest object includes:
counting the number of detections of the interest object when the interest object is detected;
detecting a first interest object from a next frame image;
determining whether or not the first interest object detected from the next frame image and the interest object are the same object by comparing the first interest object detected from the next frame image and the interest object with each other; and
updating the number of detections of the interest object when it is determined that the first interest object detected from the next frame image and the interest object are the same as each other.

7. The monitoring method according to claim 6, wherein the determining whether or not the first interest object detected from the next frame image and the interest object are the same object includes:
   calculating a first moving amount by comparing the interest object with a second interest object detected from a previous frame image;
   calculating a second moving amount by comparing the interest object with the first interest object detected from the next frame image; and
   determining that the first interest object detected from the next frame image is the same object as the interest object when a ratio of the first moving amount and the second moving amount is less than equal to a preset ratio.

8. The monitoring method according to claim 7, further comprising:
   when a new obstacle is detected from an image formed by a stereo camera during the tracking of the interest object, determining whether or not the new obstacle and a previously detected interest object are the same object by comparing the new obstacle and the previously detected interest object with each other; and
   when it is determined that the new obstacle and the interest object are the same object, tracking the new obstacle by increasing the number of detections of the interest object.

9. An automatic braking apparatus, comprising: a monitor configured to monitor an obstacle around a vehicle using the monitoring method according to claim 1; and a brake configured to brake the vehicle when the monitored obstacle is present in a first preset distance from the vehicle, wherein the monitor is configured to monitor the obstacle around the vehicle by performing steps of: detecting the obstacle using an image formed by the stereo camera and including depth information; setting a preset region around the detected obstacle as an interest region; detecting an interest object present in the interest region, wherein the detecting of the interest object includes: detecting feature points from the image; and detecting the interest object in the interest region using the feature points; and tracking the detected interest object; wherein in the detecting of the feature points, a threshold for detecting the feature points in the interest region is set to be lower than that in regions other than the interest region.

10. The automatic braking apparatus according to claim 9, further comprising a warner configured to warn a driver when the monitored obstacle is present in a second preset distance from the vehicle.

* * * * *